United States Patent [19]

Minematsu et al.

[11] Patent Number: 4,627,786

[45] Date of Patent: Dec. 9, 1986

[54] INDUSTRIAL ROBOT

[75] Inventors: Yoshihiko Minematsu; Minoru Tanaka; Kenichiro Sakamoto; Masayuki Yamamoto, all of Fukuoka, Japan

[73] Assignee: Mitsubishi Denki Kabushiki Kaisha, Tokyo, Japan

[21] Appl. No.: 587,785

[22] Filed: Mar. 9, 1984

[30] Foreign Application Priority Data

| Mar. 10, 1983 | [JP] | Japan | 58-41068 |
| Mar. 10, 1983 | [JP] | Japan | 58-41069 |
| Mar. 10, 1983 | [JP] | Japan | 58-41070 |
| Mar. 10, 1983 | [JP] | Japan | 58-41072 |
| Mar. 10, 1983 | [JP] | Japan | 58-41073 |
| Nov. 18, 1983 | [JP] | Japan | 58-218218 |
| Nov. 18, 1983 | [JP] | Japan | 58-218219 |

[51] Int. Cl.⁴ .................................. B25J 17/02
[52] U.S. Cl. .................................. 414/735; 74/479; 414/917; 901/26; 901/29
[58] Field of Search ............ 414/735, 917; 901/14, 901/26, 28, 29, 25, 15; 74/640, 479, 469, 423

[56] References Cited

U.S. PATENT DOCUMENTS

| 4,068,536 | 1/1978 | Stackhouse | 901/26 X |
| 4,507,043 | 3/1985 | Flatau | 414/917 |
| 4,507,046 | 3/1985 | Sugimoto et al. | 901/15 X |

FOREIGN PATENT DOCUMENTS

| 72624 | 2/1983 | European Pat. Off. |
| 80325 | 6/1983 | European Pat. Off. |
| 2927485 | 1/1981 | Fed. Rep. of Germany | 901/28 |
| 1565730 | 4/1980 | United Kingdom |
| 2097754 | 11/1982 | United Kingdom |

Primary Examiner—Robert J. Spar
Assistant Examiner—Donald W. Underwood
Attorney, Agent, or Firm—Sughrue, Mion, Zinn, Macpeak, and Seas

[57] ABSTRACT

An industrial robot includes a plurality of motors provided at an end of a hollow link, torque transmission units provided within said link for transmitting rotational torques of the plurality of motors, and rotary units for a plurality of independent rotational motions in response to each of the motors. The rotary units provided at the other end of the hollow link and are drivingly connected to the torque transmission units.

The rotary units comprise a first rotary device having a first box and rotating about an axis of the hollow link, a second rotary device having a second box and rotating about a rotary axis which obliquely intersects with a rotary axis of the first device, and a third rotary device having an output shaft and rotating about a rotary axis which intersects obliquely with the rotary axis of the second rotary device. The second rotary device includes a first transmission shaft (43a) one end portion of which is directly connected to the second box (66) and the other end portion of which is drivingly connected to one of the torque transmission units. The second rotary device substantially surrounds the third rotary device. Thus, the industrial robot may be made compact in size, light in weight and superior in performance.

10 Claims, 15 Drawing Figures

INDUSTRIAL ROBOT

BACKGROUND OF THE INVENTION

The present invention relates to an improvement in a drive mechanism for use in an industrial robot, and more particularly to a drive mechanism for a wrist manipulator.

Figure 1:
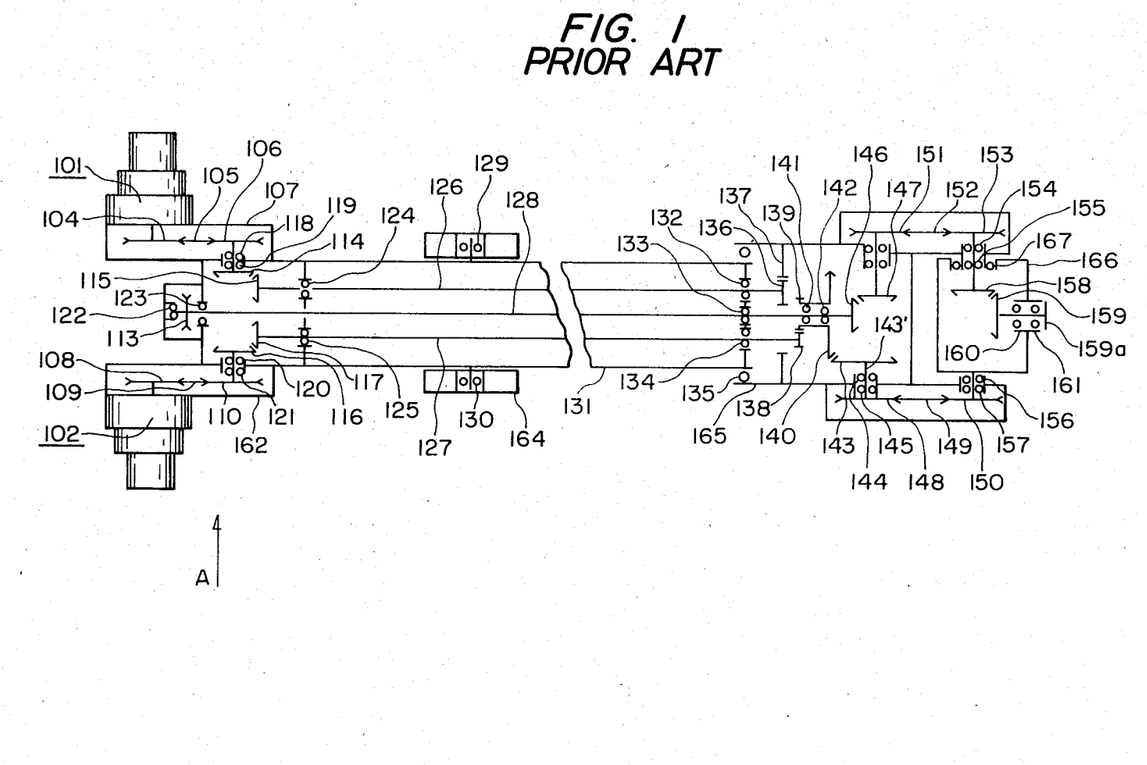
FIG. 1 is a schematic plan view showing a torque transmission system for a manipulator in an industrial robot in accordance with the prior art.
Figure 2:
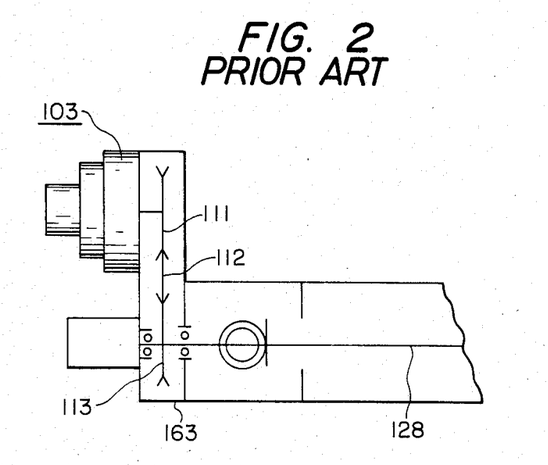
FIG. 2 is a schematic partial elevational view showing a location of a third servo motor and its transmission system shown in FIG. 1.
Figure 3:
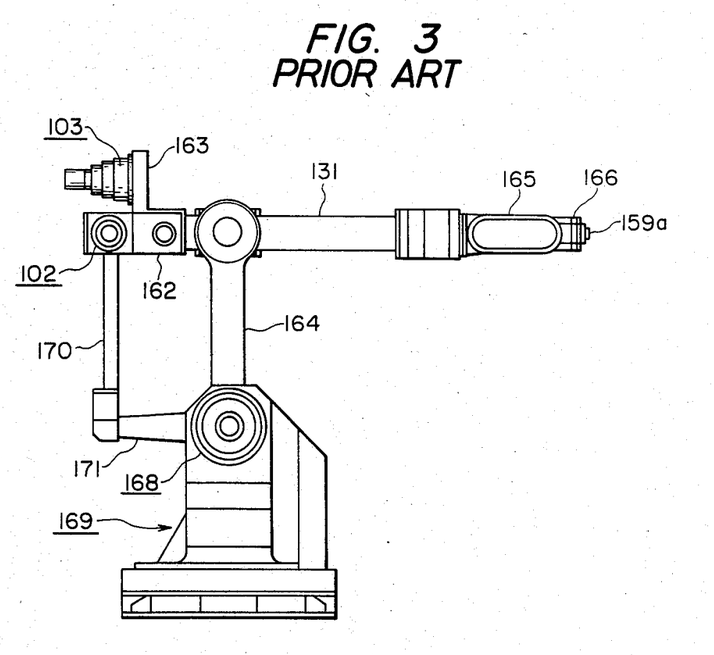
FIG. 3 is a side elevational view showing an overall appearance of the industrial robot shown in FIG. 1.

A typical prior art mechanism of such type will be described with reference to FIGS. 1 to 3. In FIGS. 1 to 3, there is schematically shown the prior art mechanism which comprises a first servo motor 101, a second servo motor 102, a third servo motor 103, a pulley 104 secured to an output shaft of the first servo motor 101, a transmission belt 105 for transmitting a rotational torque from the pulley 104 to a pulley 106, a box-shaped casing 107, a pulley 108 secured to an output shaft of the second servo motor 102, a transmission belt 109 for transmitting a rotational torque from the pulley 108 to a pulley 110, a box-shaped casing 162, a pulley 111 (FIG. 2) secured to an output shaft of the third servo motor 103, a transmission belt 112 for transmitting a rotational torque from the pulley 111 to a pulley 113, a box-shaped casing 163, bevel gears 114 and 116 secured to the pulleys 106 and 110, respectively, other bevel gears 115 and 117 engaging with the bevel gears 114 and 116, respectively, bearings 118, 119 and 120, 121 for rotatingly supporting the pulley 106, bevel gear 114 and pulley 110, bevel gear 116, respectively, drive shafts 126, 127 and 128 for transmitting the rotational torques of the bevel gears 115 and 116 and the pulley 113, respectively, bearings 122, 123 and 133 for supporting the drive shaft 128, bearings 124, 132 and 125, 134 for supporting the drive shafts 126 and 127, respectively, a second link 131 surrounding the drive shafts 126, 127 and 128 and the like, bearings 129 and 130 for supporting the second link 131, a first link 164 (best shown in FIG. 3) supporting at one end the second link 131, a first box 165 securing an inwardly toothed gear 137 later described, a bearing 135 for rotatably supporting the first box 165, a spur gear 136 secured to the drive shaft 126, the inwardly toothed gear 137 being meshed with the spur gear 136, a spur gear 138 secured to the drive shaft 127, a tubular spur gear 139 meshing with the spur gear 138, a bevel gear 140 secured to the spur gear 139, bearings 141 and 142 supporting the spur gear 139 and the bevel gear 140, a bevel gear 143 engaging with the bevel gear 140, a pulley 148 secured to a boss portion 143' of the bevel gear 143, bearings 144 and 145 supporting the bevel gear 143 and the pulley 148, a bevel gear 146 secured to the drive shaft 128, a bevel gear 147 meshing with the bevel gear 146, a transmission belt 149 for transmitting a rotational torque from the pulley 148 to a pulley 150, a pulley 151 secured to the boss portion of the bevel gear 147, a transmission belt 152 for transmitting a rotational torque from the pulley 151 to a pulley 153, a second box 166 fixed to the boss portion of the pulley 150, bearings 156 and 157 supporting the pulley 150 and the second box 166, a bevel gear 158 secured to the pulley 153, a bevel gear 159 engaging with the bevel gear 158, an output shaft 159a secured to the bevel gear 159, bearings 160 and 161 for rotatably supporting the bevel gear 159 and the output shaft 159a, bearings 154 and 155 for supporting the pulley 153 and the bevel gear 158, and bearing 167 for supporting the second box 166. A first device is composed of the spur gear 136, the inwardly toothed gear 137, the first box 165 and the like. A second device is composed of the spur gears 138, 139, the bevel gears 140, 143, the pulleys 148, 150, the second box 166 and the like. A third device is composed of the bevel gears 146, 147, the pulleys 151, 153, the bevel gears 158, 159, the output shaft 159a, and the like. It should be noted that a rotary axis of the first box 165 of the first device is perpendicular to a rotary axis of the second box 166 of the second device, and the rotary axis of the second box 166 of the second device is perpendicular to a rotary axis of the output shaft 159a of the third device.

In operation, a rotational torque of the first servo motor 101 is transmitted to the drive shaft 126 through gradual reduction in rotational speed and axis-conversion by the pulleys 104, 106 and the bevel gears 114, 115, and the rotation is further decreased in speed by the spur gear 136 and the inwardly toothed gear 137 to cause the first box 165 to rotate. The first device thus operates. Similarly, a rotational torque of the second servo motor 102 is transmitted to the drive shaft 127 through gradual reduction in rotational speed and axis-conversion by the pulleys 108, 110 and the bevel gears 116, 117 and the rotation is further decreased in speed and changed in rotary axial direction by the spur gears 138, 139 and the bevel gears 140, 143 to rotate the second box 166 through the pulleys 148, 150. The second device thus operates. A rotational torque of the third servo motor 103 is reduced in speed through the pulleys 111, 113 and is transmitted to the drive shaft 128. The rotation is gradually reduced in speed and changed in rotary axial direction through the bevel gears 146, 147 and the pulleys 151, 153 and the bevel gears 158, 159 to thereby achieve the operation of the third device. The axes of rotation of the first and second devices are perpendicular to each other and the axes of rotation of the second and third devices are also perpendicular to each other. With the operation of the first through third devices, an end work effector (not shown) mounted on the output shaft 159a may achieve a so-called "wrist" operation of three degrees of freedom.

Moreover, referring to FIG. 3, rotation of a fourth servo motor 168 causes the second link 131 to rotate through a fourth link 171 and a third link 170. By the operation of the second link 131 and the first link 164 drivingly actuated by the fourth and fifth servo motors 168, 169 and the operation of the above-described wrist mechanism, the industrial robot may manipulate in five degrees of freedom.

In the manipulating system, the rotary axis of the first device composed of the spur gear 136, the inwardly toothed gear 137, the first box 165 and the like intersects at a right angle with the rotary axis of the second device composed of the spur gears 138, 139, the bevel gears 140, 143, the pulleys 148, 150, the second box 166 and the like, and also, the rotary axis of the second device intersects at a right angle with the rotary axis of the third device composed of the bevel gears 146, 147, the pulleys 151, 153 the bevel gears 158, 159, the output shaft 159a and the like. To obtain the three degrees of freedom, a number of mechanical components such as pulleys, spur gears, bevel gears and bearings are required. As a result, the number of mechanical components is increased. In addition, there is a great fear that the overall accuracy would deteriorate due to the addition of physical errors of the respective components. The mechanism of the wrist section is complicated and is heavy in weight. Thus, a mechanical strength of each link supporting the wrist section has to be increased, which leads to the enlargement of the overall system.

SUMMARY OF THE INVENTION

A primary object of the present invention is to overcome the above-noted various defects inherent in the prior art.

Another object of the invention is to provide an industrial robot having a manipulator which is compact in size, light in weight and superior in performance, particurally with high mechanical and operational accuracy.

According to the present invention there is provided an industrial robot including a plurality of motors provided at an end of a hollow link, torque transmission means provided within said link for transmitting rotational torques of said plurality of motors, and rotary means for a plurality of independent rotational motions in response to each of said motors, said rotary means being provided at the other end of said link and being drivingly connected to said torque transmission means, said rotary means comprising a first rotary device having a first box and rotating about an axis of said link, a second rotary device having a second box and rotating about a rotary axis which obliquely intersects with a rotary axis of said first device, and a third rotary device having an output shaft and rotating about a rotary axis which intersects obliquely with the rotary axis of said second rotary device, said second rotary device including a first transmission shaft one end portion of which is directly connected to said second box and the other end portion of which is drivingly connected to said torque transmission means, said second rotary device substantially surrounding said third rotary device.

DESCRIPTION OF THE PREFERRED EMBODIMENTS

The present invention will now be described with reference to the accompanying drawings.

Figure 4:
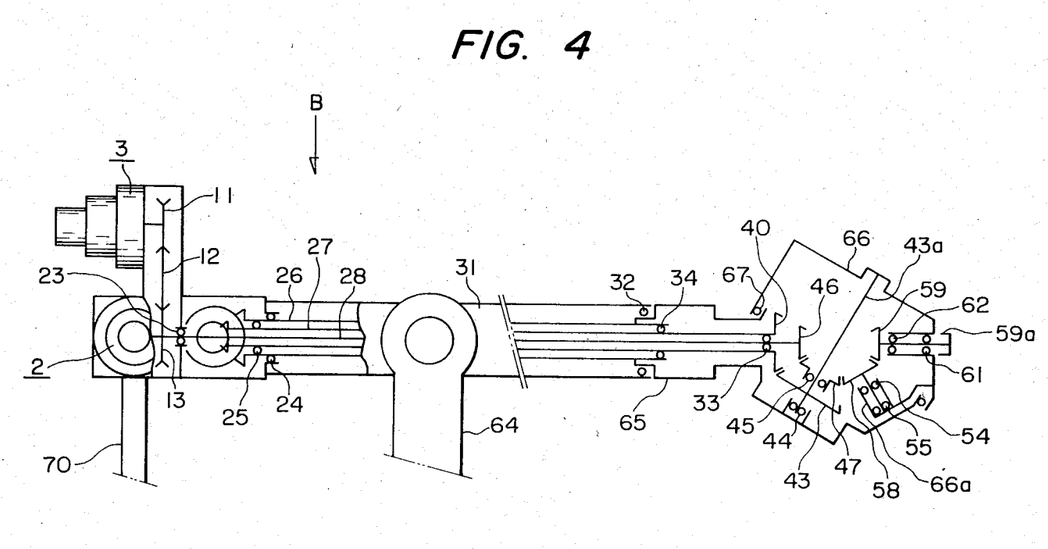
FIG. 4 is a schematical side view showing a torque transmission system for a manipulator in an industrial robot in accordance with the present invention.
Figure 5:
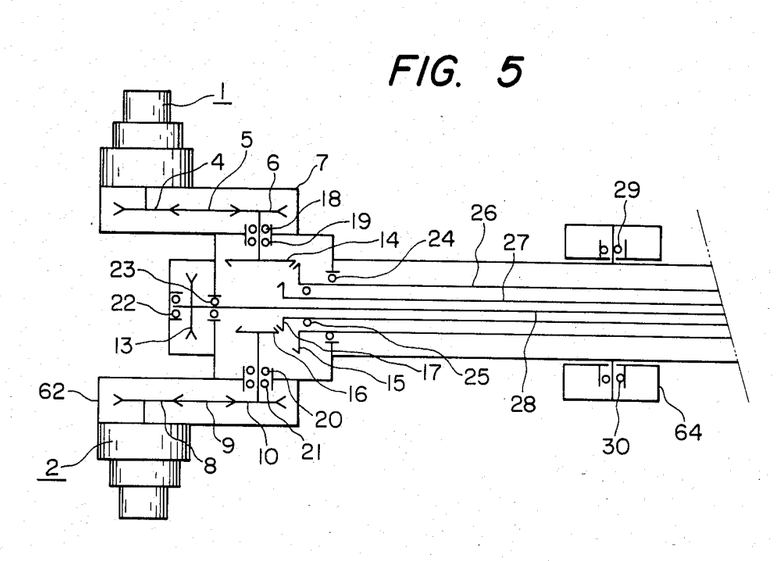
FIG. 5 is a schematic partial plan view showing a torque transmission system on the drive sources used in the manipulator shown in FIG. 4.
Figure 6:
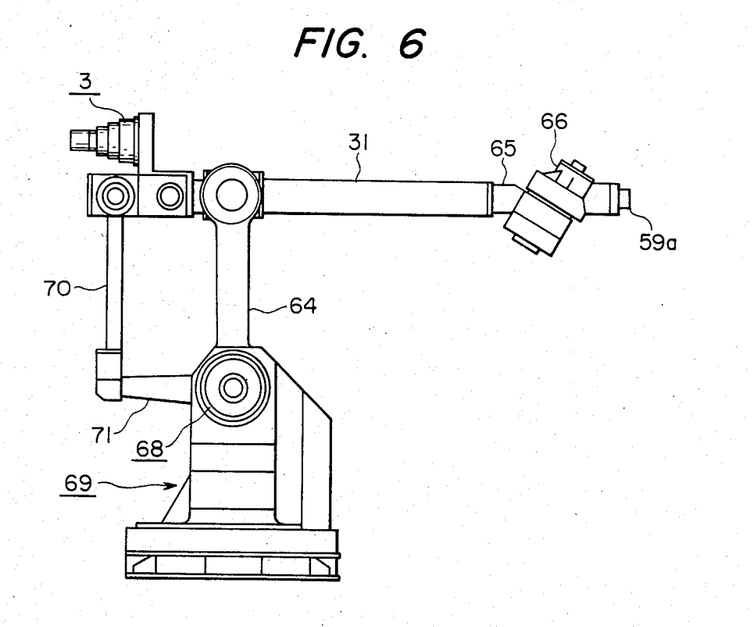
FIG. 6 is a side elevational view showing an overall appearance of the industrial robot shown in FIG. 4.

In FIGS. 4 through 6, first, second and third drive shafts 26, 27 and 28 are drivingly connected to a bevel gear 15, a bevel gear 17 and a pulley 13, respectively. The hollow drive shaft 26 incorporates therein the hollow drive shaft 27 which in turn incorporates therein the drive shaft 28, thereby forming a triple tube shaft. The hollow drive shafts 26 and 27 are supported by bearings 24, 32 and 25, 34, respectively. A first box 65 is secured to the drive shaft 26 and is rotatably supported by the bearing 32. A bevel gear 40 is secured to the drive shaft 27. A bevel gear 43 has a rotary axis which obliquely intersects with a rotary axis of the bevel gear 40 and is engaged with the latter. A second box 66 is secured at its inner bottom to a shaft 43a of the bevel gear 43 and accommodates a bearing retainer or race 66a in an integral manner. The second box 66 is substantially in the form of a cup. Namely the second box 66 is opened at one side. The bearing retainer 66a is arranged obliquely on a slant axis which intersects with the shaft 43a. A bearing 67 supports rotatably the second box 66 at the open inner edge thereof. A bearing supports the bevel gear 43 and the shaft 43a integrally formed with the bevel gear 43. A bevel gear 46 is secured to the drive shaft 28. A bevel gear 47 is provided coaxially with the bevel gear 43 and is engaged with the bevel gear 46. The bevel gear 47 is located inside of the bevel gear 43. A bevel gear 58 is engaged with the bevel gear 47 with a rotary axis thereof being slanted with respect to the rotary axis of the bevel gear 47. A bevel gear 59 is engaged with the bevel gear 58 in coaxial relation with the bevel gear 46. An output shaft 59a is secured to the bevel gear 59. Bearing 45 supports the bevel gear 47. Bearings 54 and 55 are retained in the retainer 66a to support the bevel gear 58. Bearings 61 and 62 support the bevel gear 59 and the output shaft 59a, respectively. A first device is constituted by the first box 65 and the like, a second device is constituted by the bevel gears 40, 43, the shaft 43a, the second box 66 and the like, and a third device is constituted by the bevel gears 46, 47, 58 and 59, the output shaft 59a, and the like. The rotary axis of the first box 65 of the first device and the rotary axis of the second box 66 of the second device are arranged to intersect with each other at a predetermined slant angle, and the rotary axis of the second box 66 and the rotary axis of the output shaft 59a of the third device are also arranged to intersect with each other at a predetermined slant angle.

In operation, a rotation of the first servo motor 1 is gradually decreased in speed and changed in rotary axial direction by the pulleys 4, 6 and the bevel gears 14, 15 and is transmitted to the drive shaft 26 to cause the first box 65 to rotate. Thus, the operation of the first device is attained. A rotation of the second servo motor 2 is gradually decreased in speed and changed in rotary axial direction by the pulleys 8, 10 and the bevel gears 16, 17 and is transmitted to the drive shaft 27. The outputted torque of the drive shaft 27 is further decreased in speed and changed in rotary axial direction by the bevel gears 40, 43 to cause the second box 66 fixed to the shaft 43a to rotate. Thus, the operation of the second device is attained. A rotation of the third motor 3 is transmitted through speed reduction effect of the pulleys 11, 13 to the drive shaft 28 an output torque of which is further reduced gradually through the bevel gears 46, 47, 58 and 59 while its rotary axes are converted. Finally, the output shaft 59a secured to the bevel gear 59 is rotated. Thus, the operation of the third device is attained. The rotary axes of the first and second devices intersect with each other at a predetermined slant angle, and also the rotary axes of the second and third devices intersect with each other at a predetermined slant angle. With the operation of the first through third devices, an end work effector (not shown) mounted on the output shaft 59a may achieve a so-called "wrist" operation with three degrees of freedom.

Moreover, referring to FIG. 6, by the rotation of the fourth servo motor 68 and the fifth servo motor 69, the second link 31 and the first link 64 are actuated in the same manner as in the prior art. The second link is driven through links 71, 70 by the motor 68 and the first link is simply driven by the motor 69. The industrial robot may effect an operation of five degrees of freedom.

In the above described embodiment, the second box 66 is rotatably supported by the bearing means 67 arranged on an outer periphery of the first box 65 and the bearing means 44 retained in the bearing retainer formed on the first box 65. In the case where the load imposed on the output shaft 59a is large, since the second box is made of a light metal such as an aluminum casting, the second box may stand the imposed load and may smoothly achieve its rotational operation.

The second box 66 made of a light metal may be positively supported on the first box 65, while reducing the weight of the wrist section of the manipulator and enhancing the mechanical strength of the box 66 per se.

Preferably, the first and second boxes 65 and 66 are made of a light metal such as an aluminum casting. Particularly, it is desirable that the second box 66 be made of a light metal.

Figure 7:
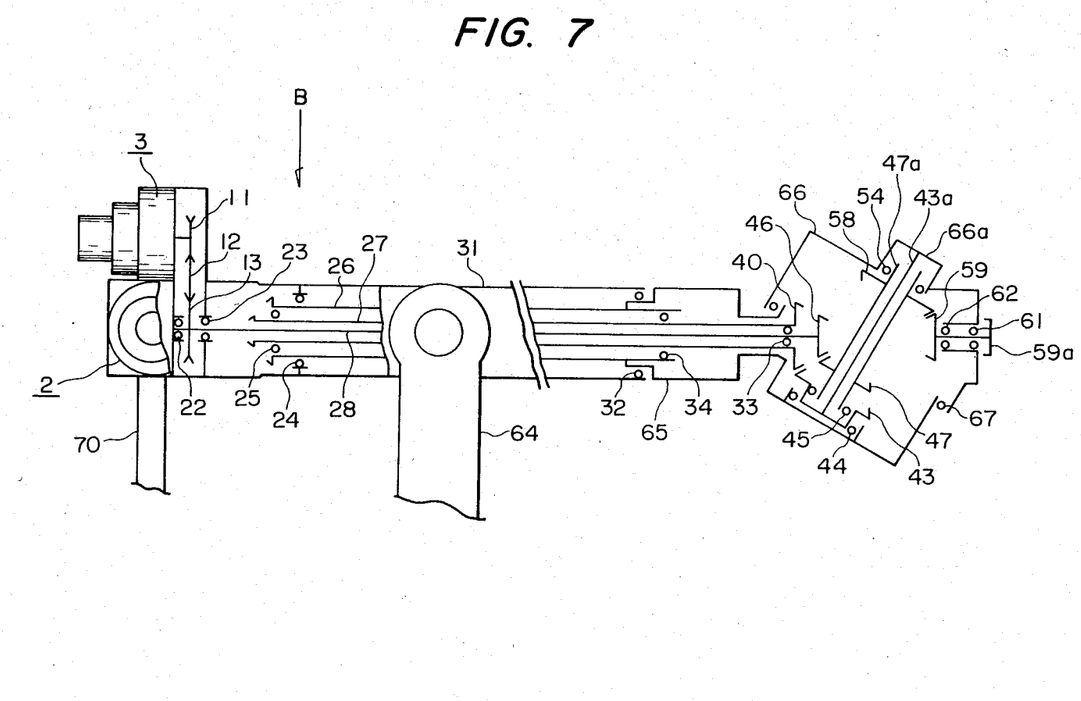
FIG. 7 is a schematic fragmentary, in part, side view showing another embodiment of the invention.

FIG. 7 shows another embodiment of the invention. In FIG. 7, the same reference numerals are used to indicate the like components or members shown in FIGS. 4 to 6. The difference between both the embodiments is that the bevel gears 47 and the bevel gear 58 are arranged on diametrically opposite sides with respect to an intersection defined between the rotary axis of the first device and the rotary axis of the second device, and a shaft 43a is surrounded by a tubular shaft 47a. The transmission shaft 43a transmits a rotational torque from the second drive shaft 27 and the transmission shaft 47a transmits a rotational torque from the third drive shaft 28. More specifically, the bevel gear 40 secured to the second drive shaft 27 is engaged with the bevel gear 43, the transmission shaft 43a is secured to the bevel gear 43 at one end and is secured at the other end to a recess portion 66a of the second box 66. On the other hand, the bevel gear 46 secured to the third drive shaft 28 is engaged with the bevel gear 47, the outer tubular shaft 47a is provided sequrely at its outer periphery with the bevel gears 47 and 58. With such a gear train arrangement, the second box 66 may rotate through 360° around its own axis.

Figure 8:
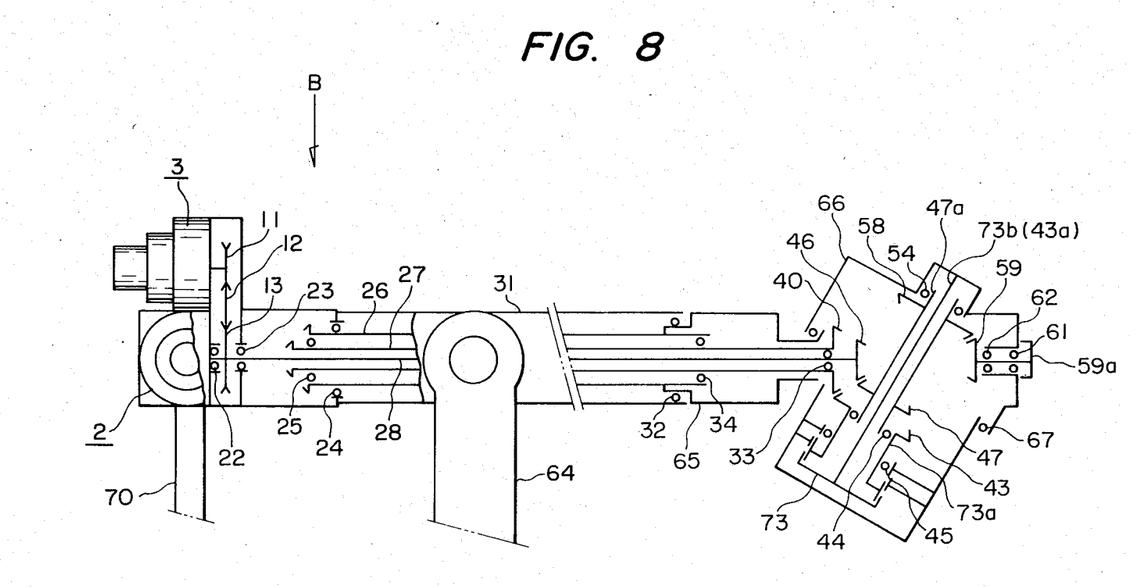
FIG. 8 is a schematic fragmentary, in part, side view showing still another embodiment of the invention.

FIG. 8 shows another embodiment of the invention, which is a variant of the embodiment shown in FIG. 7. In FIG. 8, the manipulator is provided at the second device with a reduction means 73 such as a harmonic reduction gear well known per se in the art. A hollow input shaft 73a of the reduction gear 73 is secured to the bevel gear 43. An output shaft 73b of the reduction gear 73 is passing through the hollow space of the transmission shaft 47a and the input shaft 73a in a coaxial fashion. The second box 66 is fixed to the output shaft 73b, i.e., the transmission shaft 43a. The input shaft 73a is rotatably supported by the bearing 45.

With such an arrangement, the rotary torque of the second motor 2 is transmitted in the same manner as described above to the bevel gear 43. The rotation of the input shaft 73a is further reduced in speed through the reduction gear 73. The outputted desired rotational torque from the output shaft 73b is transmitted to the second box 66. It should be noted that in the embodiment, the input shaft 73a extends in the same direction as that of the output shaft 73b in the reduction gear 73.

The second device includes the reduction gear in a coaxial manner, and the input shaft 73a incorporates therein the output shaft 73b so that space may be saved and the reduction gear per se may be compact while obtaining a desired reduction ratio.

Figure 9:
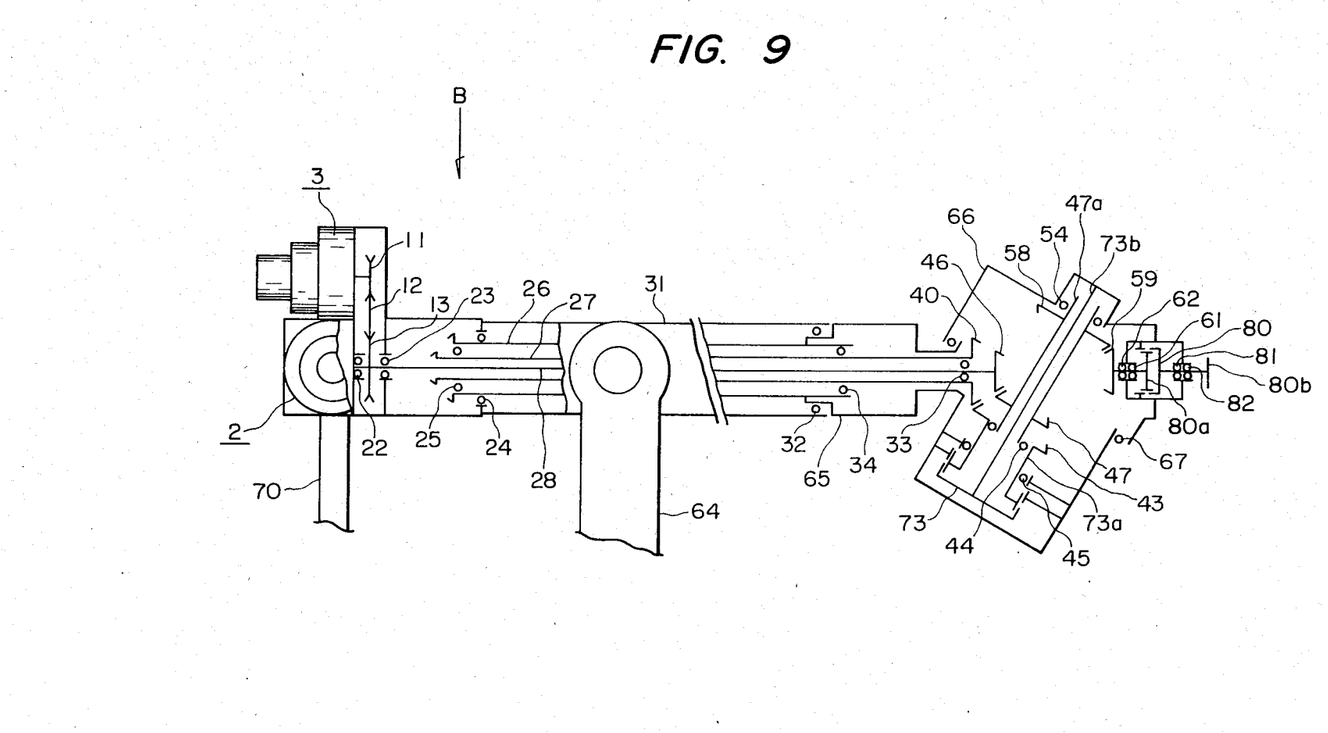
FIG. 9 is a schematic fragmentary, in part, side view showing another embodiment of the invention.

FIG. 9 shows another embodiment of the invention, which is a variant of the embodiment shown in FIG. 8. In FIG. 9, the manipulator is further provided at the third device with a reduction means 80 such as a harmonic reduction gear. The reduction gear 80 has on one hand an input shaft 80a coupled to the bevel gear 59. The reduction gear 80 has on the other hand an output shaft 80b which has the same function as that of the end-effector. The output shaft 80b is supported by bearings 81 and 82. The rotary axis of the output shaft 80b intersect obliquely with the rotary axis of the second device.

With such an arrangement, the rotation transmitted to the bevel gear 59 of the third device is further reduced in speed through the reduction gear 80.

In general, an industrial robot is often used in a restricted space in a working station such as an assembly or welding station, and around the industrial robot, there is various other equipment and preproducts. If the industrial robot collides with such equipment or preproducts, an excessive load would be abruptly imposed to the torque transmission system of the industrial robot. In particular, since the end-effector or manipulator is set at an end portion of the industrial robot, the second box would collide with such equipment, resulting in a breakdown of part of the drive torque transmission system. This makes it necessary to replace the overall wrist section with new one.

Figure 10:
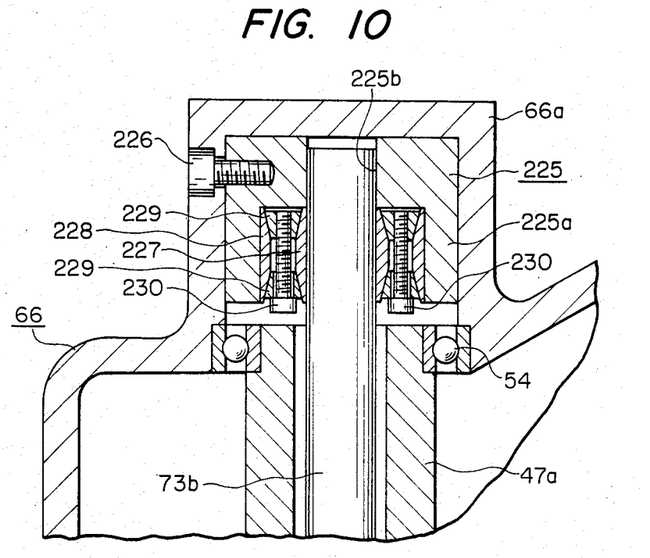
FIG. 10 shows a variant of the wedge means used in the preceding embodiments of the invention.

In order to avoid such drawbacks, FIG. 10 shows a detailed sectional view of an outwardly projecting cylindrical portion 66a of the second box 66 for accommodating a power lock wedge means. In FIG. 10, a housing 225 is pressingly inserted into the cylindrical portion 66a of the second box 66. The housing 225 has a sleeve portion 225a and an engagement portion 225b into which the transmission shaft 73b is pressingly inserted. A bolt 226 is threadedly engaged with the housing 225 for fastening the latter to the cylindrical portion 66a. A first annular wedge 227 is arranged in the sleeve portion 225a and is in contact with an outer periphery of the transmission shaft 73b. The first annular wedge 227 has a larger diameter portion in the middle and tapered portions at both edges. A second annular wedge 228 is in contact with an inner periphery of the sleeve portion 225a. The second annular wedge 228 has a smaller diameter portion in the middle and tapered portions at both edges. A pair of third wedges 229 are arranged between the first and second wedges 227 and 228 corresponding to the tapered portions thereof. Each of the third wedges 229 has an overall tapered surface as shown. A bolt 30 passes through one of the third wedges and threadedly engages with the other. A wedge unit is composed of the first, second and third wedges 227, 228, 229, the bolts 230 and the housing 225. By rotating the bolt 230, the pair of third wedges 229 approach each other, urging the first wedge 227 to pressingly contact against the outer periphery of the transmission shaft 73b and at the same time, causing the second wedge 28 to pressingly contact against the inner periphery of the sleeve portion 225a of the housing 225. The transmission shaft 73b is connected to the second box 66 through the wedge unit composed of the first wedge 227, the second wedge 228, the third wedge 229, the bolts 230 and the housing 225. The tightening torque of the bolts 230 is adjusted so that only when an excessive load torque is imposed on the transmission mission shaft 73b, slippage will be caused on one or both of the contact surfaces between the first wedge 227 and the transmission shaft 73b and the contact surface between the second wedge 228 and the housing 225. Therefore, a breakdown of the components of the wrist manipulator may be positively prevented.

With such a construction, the following advantage is offered. Upon assembling the wedge unit, there is no gap between the housing 225 and the second box 66. Accordingly, backlash in the rotational direction of the transmission shaft 73b and the second box 66 may be prevented. In the wrist manipulator, if such backlash is large, the final operational error would also be large. It is thus important to suppress such backlash. According to prior art techniques which have used a key, pin and other engagement devices, it is necessary to set the transmission shaft 73b and the second box 66 at the work site. Such a defect may be completely overcome according to the present invention.

Figure 11:
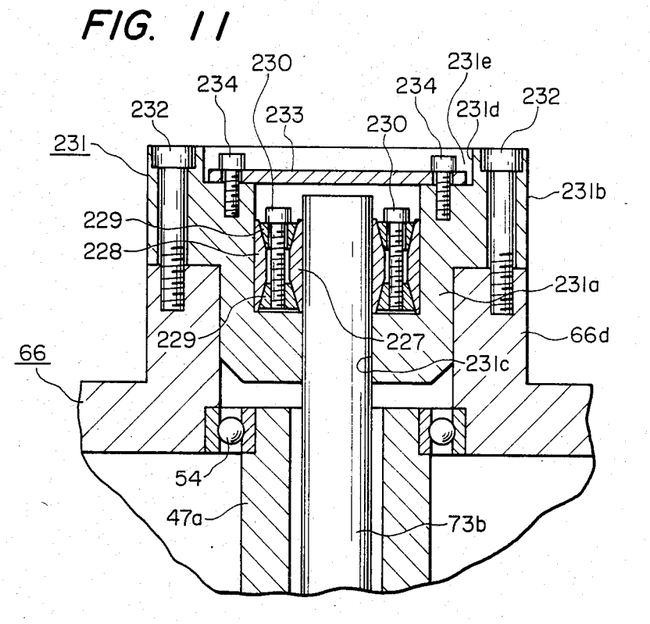
FIG. 11 shows another variant of the wedge means.

FIG. 11 shows a variant of the device shown in FIG. 10. In FIG. 11, an outwardly opened sleeve portion 66d is formed in the second box 66. A housing 231 comprises an outwardly opened sleeve portion 231a engaged with the sleeve portion 66a, a jaw 231b contacting with an end face of the sleeve portion 66d, a through hole 231c into which the transmission shaft 73b is inserted, and a recess 231 defined by an opened end portion 231d. A plurality of bolts 232 are used to fix the housing 231 to the end face of the sleeve portion 66d. A cover 233 is located at the recess 231e to cover the opening space of the sleeve portion 231a. The cover 233 is fastened to the recess 231e of the housing 231. The other components or members are indicated by the same numbers or characters as used in FIG. 10.

With such a construction, since the sleeve portion 231a of the housing 231 is opened outwardly, and the housing 231 is inserted from the outside, the wedge unit may readily be assembled. In addition, in the case where after the slippage is caused between the transmission shaft 73b and the housing 231, the original or reference point is reset, and the dismounting of the overall unit is dispensed with.

Figure 12:
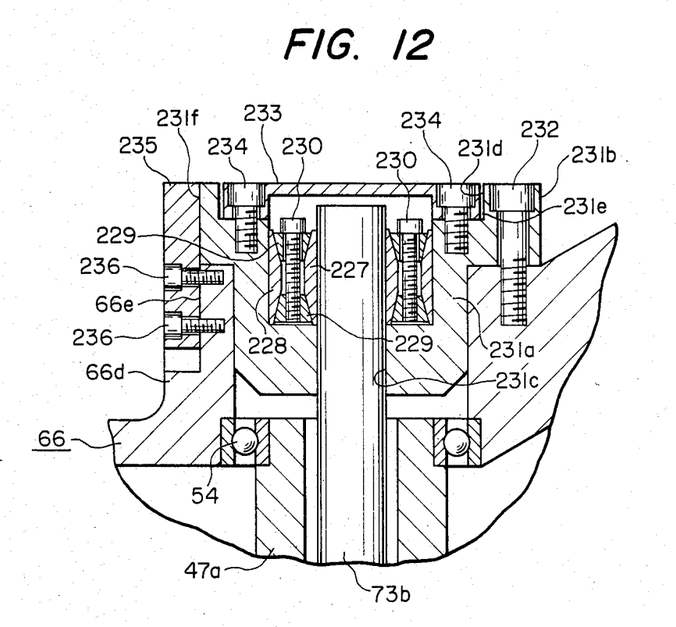
FIGS. 12 and 13 show another variant of the wedge means.
Figure 13:
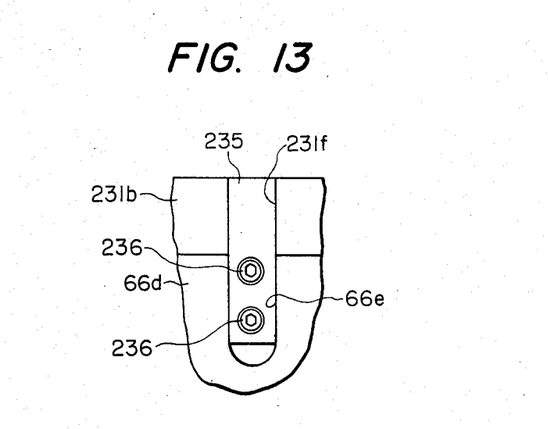

Still another variant of the wedge unit will be described with reference to FIGS. 12 and 13, in which a key groove 231f is formed on the outer periphery of the housing 231 and extends substantially in the same direction as the axial direction of the transmission shaft 73b. A key groove 66e is formed in the outer periphery of the sleeve portion 66d of the second box 66 and extends in the axial direction of the transmission shaft 73b in alignment with the key groove 66e. A key 235 is engaged with both the key grooves 66e and 231f. Bolts 236 are threadedly engaged with the sleeve portion 66d to fasten the key 35 to the sleeve portion 66d. With such a construction, the housing 231 is prevented from rotating.

Figure 14:
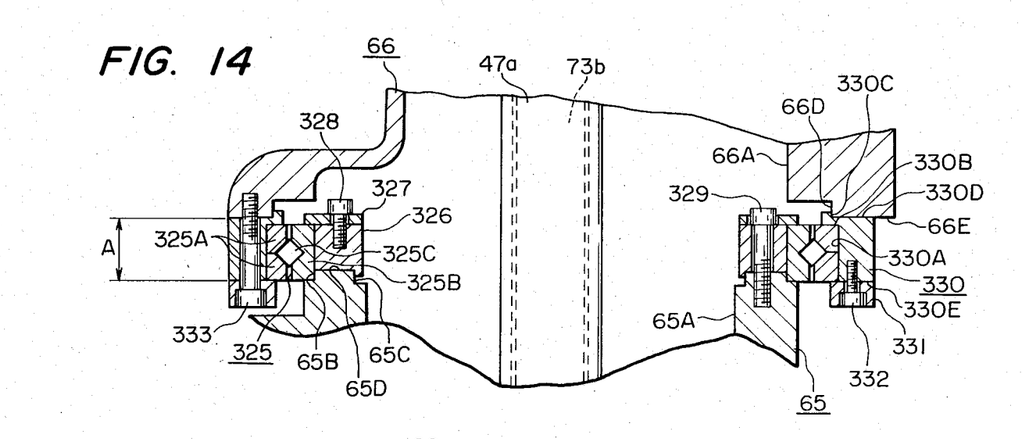
FIGS. 14 and 15 show the bearing means between the first and second boxes used in the preceding embodiments of the invention.

FIG. 14 shows a detailed view showing a bearing portion between the first box 65 and the second box 66. In FIG. 14, an engaging portion 65B is formed on the outer periphery of an opening portion 65A of the first box 65 in a coaxial fashion with the transmission shaft 73b. An engaging portion 65C is formed on the inner periphery of the opening portion 65A of the first box 65, also in coaxial fashion with the transmission shaft 73b. An end face of the opening portion 65A is indicated by character 65D. An engaging portion 66D is formed in the inner periphery of an opening portion 66A of the second box 66 in a coaxial fashion with the transmission shaft 73b. Each of cross roller bearings 325 has a pair of outer races 325A divided into two halves and an inner race 325B. A roller 325C is surrounded by the pair of outer races 325A and the inner race 325B. An end face of the inner race 325B is engaged with the engaging portion 65B. A ring 326 is inserted into the inner race 325B and engaged with the engaging portion 65C. A retaining plate 327 comes into contact with the other end face of the inner race 325B. The retaining plate 327 is pressingly contacted with the inner race 325B by a plurality of bolts 328 which are screwed into the inner race 325B. The ring 326 is secured to the first box 65 by bolts 329 which are screwed into the first box 65. A fastening means is composed of the ring 326, the retaining plate 327, and the bolts 328 and 329. A ring 330 comprises an engaging portion 30A engaging with the pair of outer races 325A, a step 33B contacting with the end face of one of the outer races 325A, an engaging portion 330C engaging with the engaging portion 66D of the second box 66, an end face 330D contacting with the end face 66E, and the other end face 330E parallel to the end face 330E. A plate 331 contacts against the end face 330E and the other outer race 325A. A plurality of bolts 332 screwing into the ring plate 331 serve to couple the plate 331 and the ring 330 to each other. An intermediate unit is composed of the ring 330, the plate 331, and the bolts 332. Bolts 333 serve to couple the ring 330 and the plate 331 to each other, to thereby form a second fastening unit.

Upon assembling the first box 65 and the second box 66, the pair of outer races 325A are brought into contact with the engaging portion 330A of the ring 330, the plate 331 is brought into contact with the outer race 325A and the end face 330E of the ring 330, and then the bolts 332 are threaded in, whereby the pair of outer races 325A are held between the plate 331 and the ring 330. Then, a distance A between the side end surface of the first box 65 aligned with the cross roller bearing 325 and the end face 330D of the ring 330 is inspected. In this case, if the distance A is not in a predetermined allowance range, for example, the end face 330D is cut by machining. Namely, although the cross roller bearing 325 has sufficient durability against a thrust load, the allowance error in the axial direction is larger so that the above described machining adjustment work is necessary. The thus machined bearing unit 325 may be handled as one-piece with the ring 330 and the plate 331. The inner race 325B of the bearing unit is engaged with the engaging portion 65B. Subsequently, the retaining plate 327 is coupled to the ring 326 by bolts 328. Then the ring 326 is coupled to the first box 65 by bolts 329. The engaging portion 66D of the second box 66 is engaged with the engaging portion 330C of the ring 330, and the ring 330 and the plate 331 are coupled to the second box 66 by bolts 333, so that the second box 66 is rotatably mounted on the first box 65. Thus, backlash due to the cross roller bearing 325 may be suppressed.

Figure 15:
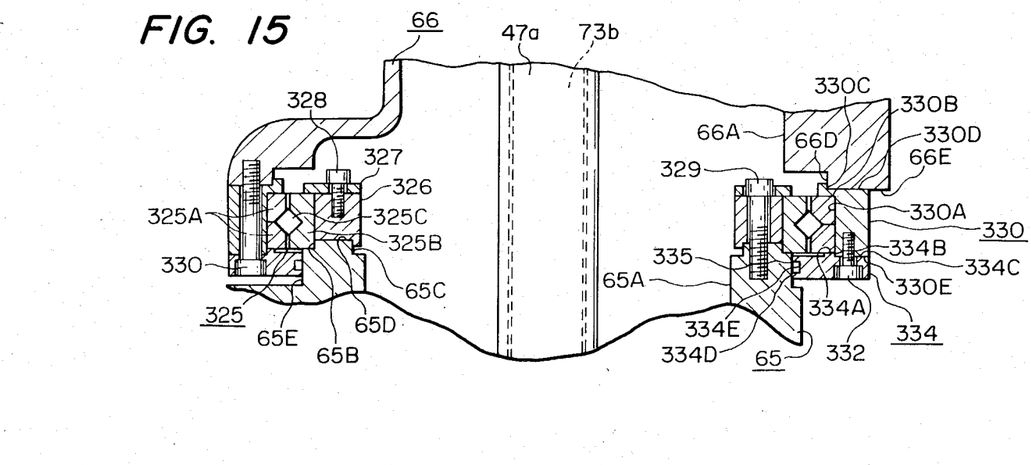

FIG. 15 shows a primary cross sectional view of another variant of the bearing unit. A circumferential portion 65E is coaxially formed with the engaging portion 65B and has a larger outer diameter than that of the engaging portion 65B. A plate 334 comprises an end face 334A in contact with one of the outer races 325A, an engaging portion 334B engaged with the engaging portion 330a of the ring 330, an end face 334C in abutment with the end face 330E of the ring 330, an inner periphery 334D facing the outer circumferential portion 65E through a small spacing, and annular groove 334E formed along the inner periphery 334D. A seal ring is disposed on the outer circumferential groove 334E for sealing the spacing between the circumferential portion 65E and the inner periphery 334D.

While the invention has been described in datail and with reference to specific embodiments thereof, it will be apparent to one skilled in the art that various changes and modifications can be made therein without departing from the spirit and scope thereof.

We claim:

1. An industrial robot including a plurality of motors provided at an end of a hollow link, torque transmission means provided within said link for transmitting rotational torques of said plurality of motors, and rotary means for effecting a plurality of independent rotational motions in response to each of said motors, said rotary means being provided at the other end of said link and being drivingly connected to said torque transmission means, said rotary means comprising a first torque transmission means, said rotary means comprising a first rotary device having a first box (65) and rotating about an axis of said link, a second rotary device having a second box (66) and rotating about a rotary axis which obliquely intersects with a rotary axis of said first device, and a third rotary device having an output shaft and rotating about a rotary axis which intersects obliquely with the rotary axis of said second rotary device, said second rotary device including a first transmission shaft (43a) one end portion of which is directly connected to said second box (66) and the other end portion of which is drivingly connected to said torque transmission means, said second rotary device substantially surrounding said third rotary device, said first box (65) being drivingly connected to a first drive shaft (26), said second rotary device further including a first bevel gear (40) coupled to a second drive shaft (27), and a second bevel gear (43) engaging said first bevel gear (46), said first transmission shaft (43a) having at one end said second bevel gear (43) and obliquely intersecting with said rotary axis of said first device, and said third rotary device including a third bevel gear (46) coupled to a third rotary drive shaft (28), a fourth bevel gear (47) rotatable in coaxial relation with said first transmission shaft (43a), a fifth bevel gear (58) engaging with said fourth bevel gear (47) and having a rotary axis which obliquely intersects with said rotary axis of said second rotary device, and a sixth bevel gear (59) engaging with said fifth bevel gear (58), said output shaft (59a) being coupled to said sixth bevel gear.

2. The industrial robot of claim 1, said torque transmission means including said third drive shaft (28) for transmitting the rotational torque of a third motor (3) of said plurality of motors to said third rotary device, said second drive shaft (27) transmitting the rotational torque of a second motor (2) of said plurality of motors to said second rotary device, said second drive shaft (27) including a hollow tube having an inner diameter larger than an outer diameter of said third drive shaft (28), and said first drive shaft (26) for transmitting the rotational torque of a first motor (1) of said plurality of motors to said first rotary device, said first drive shaft (26) including a hollow tube having an inner diameter larger than an outer diameter of said second drive shaft, said first, second and third drive shafts being provided in a coaxial fashion with each other.

3. The industrial robot of claim 1, said second box (66) being made of light metal.

4. The industrial robot of claim 3, said first box (65) being made of light metal.

5. The industrial robot of claim 1, said hollow link (31) being rotatably supported at an intermediate portion by a first link (64) and driven by a fourth motor (68), said industrial robot further including a fifth motor (69) for driving said first link.

6. The industrial robot of claim 5, said first, second and third motors (1, 2, 3) being arranged at the other end of said hollow pink (31) on the opposite side of said first, second and third rotary devices.

7. The industrial robot of claim 5, said hollow link (31) being driven by a link mechanism (70, 71).

8. The industrial robot of claim 1, said second box (66) being of the open type to the inside thereof.

9. The industrial robot of claim 1, said fourth bevel gear (47) being located outward of said second bevel gear (46).

10. The industrial robot of claim 1, said first drive shaft (26) being directly coupled to said first rotary box (65).

* * * * *